United States Patent [19]

Nelson et al.

[11] Patent Number: 4,782,210
[45] Date of Patent: Nov. 1, 1988

[54] RIDGED ELECTRODE

[75] Inventors: David J. Nelson, West Lebanon, N.H.; William Wakefield, Windsor, Vt.; Raymond G. Wilkins, Hanover, N.H.

[73] Assignee: Thermal Dynamics Corporation, West Lebanon, N.H.

[21] Appl. No.: 67,017

[22] Filed: Jun. 26, 1987

[51] Int. Cl.[4] .............................................. B23K 9/00
[52] U.S. Cl. ................................. 219/121.52; 219/75; 219/119; 219/121.48
[58] Field of Search ................. 219/121 PR, 121 PM, 219/121 PQ, 121 PP, 121 PT, 74, 75, 76.16, 76.15, 119; 313/231.31, 231.41, 231.51

[56] References Cited

U.S. PATENT DOCUMENTS

| | | | |
|---|---|---|---|
| 2,960,594 | 11/1960 | Thorpe | 219/121 PR |
| 3,296,410 | 1/1967 | Hedge | 219/121 PR |
| 3,450,926 | 6/1969 | Kiernan | 219/121 PR |
| 4,649,257 | 3/1987 | Yakovelitch | 219/121 PQ |
| 4,691,094 | 9/1987 | Hatch et al. | 219/121 PR |

Primary Examiner—M. H. Paschall
Attorney, Agent, or Firm—Majestic, Gallagher, Parsons, Siebert

[57] ABSTRACT

An electrode used in a plasma-arc torch has ridges formed on the side surface thereof for initiating a pilot arc. The required voltage for initiating a pilot arc is substantially reduced by employing this type of electrode. The ridges have much smaller radii of curvature which substantially enhance the local electric field strength responsible for creating the pilot arc discharge. The ridges are oriented substantially along the flow lines of the plasma gas so as to create the least disturbance. In one embodiment with spiral gas flow, this results in helically oriented ridges. In another embodiment with straight gas flow, the ridges are parallel to the longitudinal axis of the electrode.

10 Claims, 1 Drawing Sheet

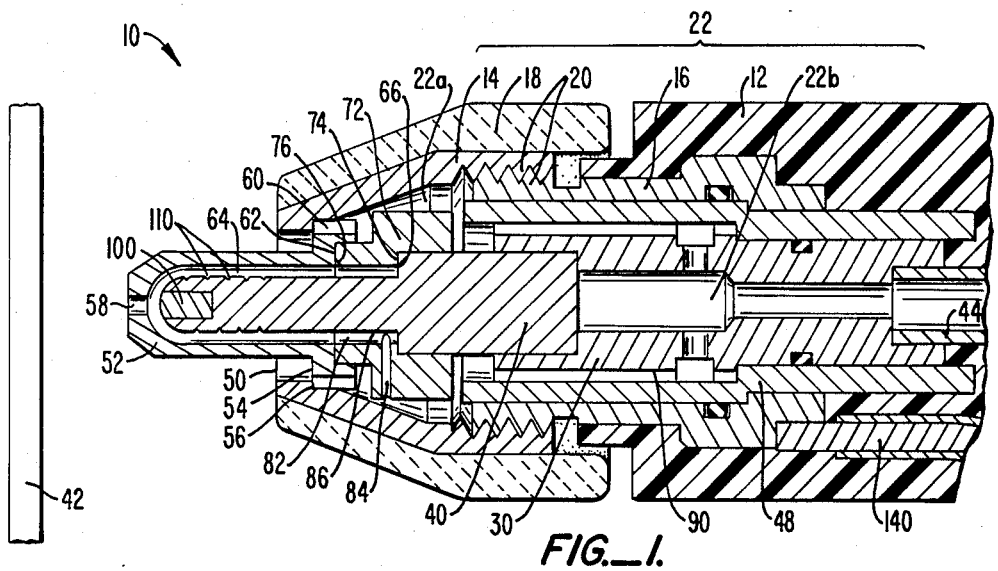
FIG._1.
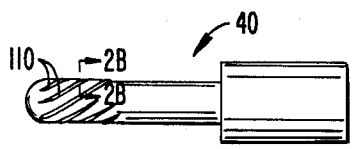
FIG._2A.
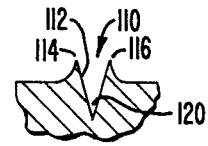
FIG._2B.
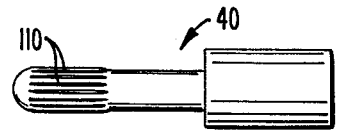
FIG._3.
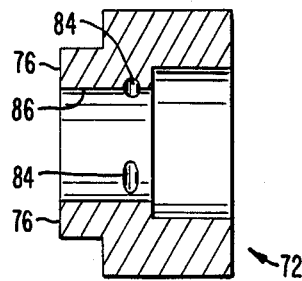
FIG._5.
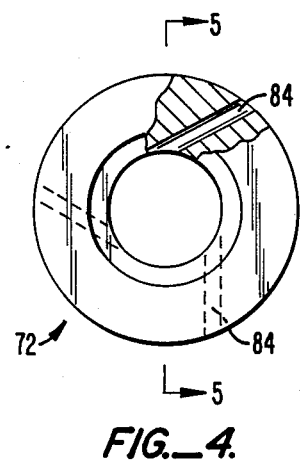
FIG._4.

RIDGED ELECTRODE

BACKGROUND OF THE INVENTION

1. Field of the Invention

This invention is related to plasma-arc torches which are generally used for cutting, welding and spray bonding and more specifically to an electrode having improved pilot arcing for such torches.

2. Description of the Invention

Plasma-arc torches, also known as electric arc torches, are commonly used for cutting, welding and spray bonding of workpieces and operate by directing a plasma consisting of ionized gas particles toward a workpiece. In the operation of typical plasma-arc torches, such as illustrated in U.S. Pat. Nos. 4,585,921; 4,581,516; 4,324,971; 4,170,727; and 3,813,510; assigned to the same assignee as the present invention, a gas to be ionized is supplied to the front end of the torch and flows between a pair of electrodes before exiting through an orifice in the torch tip. The electrode which is at a relatively negative potential is usually referred to as the "cathode" or simply as the "electrode." The torch tip which is adjacent to the end of the electrode, at the front end of the torch, constitutes the relatively positive potential electrode or "anode." When a sufficiently high voltage is applied, an arc is caused to jump the gap between the electrode and the torch tip, thereby heating the gas and causing it to ionize. A pilot pulsating voltage between the electrode and the torch tip maintains an arc known as the pilot, or non-transferred arc. The ionized gas in the gap is blown out of the torch ad appears as a flame that extends externally off the tip. During this transferred arc operation, the workpiece serves as the anode. As the torch head or front end is brought down towards the workpiece, the arc jumps or transfers between the electrode and the workpiece instead since the impedance of the workpiece current path is lower than the impedance of the torch tip current path.

In conventional torches, the consumable negative potential electrode or cathode is usually made of copper and commonly has at its end a refractory metal insert such as one from the Group IVb elements of the Periodic Table. Conventional electrodes generally assume the form of a smooth elongated copper rod with a hafnium or zirconium insert recessed into its end.

In starting a plasma-arc torch, a high-frequency, high-voltage pulse(s) causes an arc to jump between the tip and electrode. This happens when the electric potential applied across the tip and the electrode produces a local electric field that exceeds the dielectric-breakdown field strength of the gas therebetween. This breakdown is then followed by the DC pilot arc.

For a given potential, this local electric field is a function of both the distance between, and the relative geometries of the torch tip and the electrode. Generally, a higher electric field is obtained with a closer spacing or with a smaller radius of curvature of the electrode surface.

On the other hand, the dielectric-breakdown field strength of the plasma forming gas is generally a function of the type of gas used, as well as its pressure and temperature. Various gases or mixtures of gases may be used, for example air.

In practice, the electric potential required for arcing is not a well defined value. It assumes a standard distribution caused by random molecular gas motion, cathode spot wandering on the metal surfaces with consequent localized pitting and oxide formation, and mechanical tolerances over production runs.

Typcially, in the case of the smooth electrodes, any one torch and electrode combination has a short term variation of 4 KV. Such torch may most probably arc at 8 KV but there are instances when it will arc at as low as 5 KV or as high as 12 KV. That is, the pilot voltage required assumes a standard distribution that peaks at 8 KV with the tails extending to 5 KV and 12 KV. When the pilot voltage of a torch is designed in the 8 KV to 8.5 KV range (i.e. in the most probable range), there will still be quite a number of firings which will produce no arcing. Test results show that the smooth electrode fires less than half the time because most of the required arcing voltages are above what the power supply provides. Experience shows an annoying tendency to go for long periods of time with no piloting following by short bursts of piloting. This combination gives erratic, unacceptable operation.

One solution is to upgrade the power supply to generate arc voltage above 12 KV to cover the worst case. This should give reliable piloting. While this is possible, the practical constraints are increased size, increased cost, increased radio frequency interference, and the need to better insulate the torch and leads.

Alternatively, the required firing voltage can be lowered by either reducing the dielectric-breakdown field strength of the gas or increasing the local electric field strength.

The reduction of the dielectric-breakdown field strength can be achieved by such means as reduced gas pressure. However, the gas pressure, flow, and swirl are already selected for best cutting performance and cannot be changed.

The local electric field strength can be increased by closer spacing, or designing pointed instead of smooth surfaces.

Close spacing brings mechanical tolerance problems and the spacing is also optimized for best cutting performance.

Pointed surfaces are difficult to make, can wear down, and may not be conducive to the controlled gas flow that gives best cutting performance.

SUMMARY AND OBJECTS OF THE INVENTION

It is an object of the present invention to improve the performance of the pilot arc of a plasma-arc torch without comprising the other parameters of the torch.

It is another object of the present invention to provide an improved electrode which will lower the potential required for creating the pilot arc.

It is yet another object of the present invention to provide an improved electrode which is economical and easy to implement in existing devices.

This and additional objects of the present invention are accomplished, briefly by employing at least a pair of spaced-apart electrodes defining a chamber in which electric arcs are to be formed. One or more ridges are formed on at least one of the electrodes. The ridges, preferably formed by knurling, give the sharp pointed surfaces for enhancing the local electric field strength in the arc chamber, thereby reducing the voltage for initiating the arcs. In the particular case of a plasma-arc torch where a plasma forming gas flows through the arc chamber, the ridges are oriented substantially along the flow line of the gas. This preserves the gas flow characteristics which have been optimized for cutting performance. In cases where the dimensions of the ridges are such that they do not affect the gas flow adversely, the ridges' orientations are not so critical. A reduced voltage is then required across the pair of electrodes to give consistent and reliable pilot arc in the arc chamber.

The knurling operation moves metal from one area and plows it into a ridge. The resulting furrow and ridge give a sharp edge that drastically reduce the arc firing voltage. This method is superior to a single sharp point because a single point wears down as repeated piloting removes metal. On the knurled electrode, as piloting removes metal from one section of the ridge, plenty of other ridge top area remains for low voltage arc initiation.

As mentioned earlier, for typical smooth electrodes and torch combinations, the electric potential required for arcing assumes a standard distribution within the range 5-12 KV, whereas for ridged electrodes, the corresponding voltages are within the range 3-6 KV, which is a substantial reduction.

Test results show that for a torch that generates 50 pulses per second at about 8 KV, a pilot arc occurs on every one of the available pulses. Statistical estimates have shown that there is only 1 chance in 500 of not firing. This translates to only one missed pulse every 10 seconds.

This has only briefly summarized the major aspects of the preset invention. Other objects, advantages and aspects of the present invention will become apparent from the following detailed description which should be taken in conjunction with the accompanying drawings.

BRIEF DESCRIPTION OF THE DRAWINGS

FIG. 1 is a side elevation cross-sectional view of the front part (torch head) of a plasma-arc torch with the preferred embodiment electrode installed in place.

FIG. 2A is a side elevation view of the electrode of the preferred embodiment.

FIG. 2B is a partial section view along lines 2B—2B of FIG. 2A.

FIG. 3 is a side elevation view of the electrode according to another embodiment of the invention.

FIG. 4 is a front elevation view of the gas distributor of the plasma torch of FIG. 1 which is partially cut away to show details thereof.

FIG. 5 is a cross-sectional view of the gas distributor along lines 5—5 of FIG. 4.

DETAILED DESCRIPTION OF THE PREFERRED EMBODIMENT

FIG. 1 is a cross-sectional view of the front portion, or torch head, with the preferred embodiment of the electrode in place. As shown in FIG. 1, the plasma-arc torch 10 comprises a torch housing 12 and a cup 14. The torch housing 12 is made of electrically insulating material and surrounds an annular anode body 16 which forms a mechanically integral casing. The cup is also surrounded by an insulating shield 18. The cup and the housing may be connected by any conventional means so long as the connection is sturdy after connecting and that the two may be easily disconnected. In the preferred embodiment, the cup and the anode body are threaded in a complementary manner so that the cup may be screwed onto the anode body 16 by means of threads 20. Constructed in this manner, the cup portion may be disconnected so that the electrode and torch tip assembly described below may be easily assembled or disassembled.

As shown in FIG. 1, both the anode body and cup are generally cylindrical so as to define a cylindrical chamber 22. At the center of chamber 22 is a electrode body 30 which provides support for electrode 40 at the front end, and for an electrical and gas conduit line 44 at the other end. The electrode body 30 is buffered by, and insulated from the anode body by an annular insulator 48.

The side of the cup away from the housing tapers and has an outlet 50 through which chamber 22 communicates with the exterior. A cup-shaped torch tip 52 fits into the outlet 50 thereby closing the outlet except for a plurality of controlled openings in the torch tip, as will be hereinafter described. The cup-shaped torch tip has an annular rim 54 shaped to fit into shoulder 56 on the inside surface of the cup near outlet 50. The cup-shaped torch tip has an orifice 58 in the bottom of the cup for passage of the transferred arc between electrode 40 and a representative workpiece such as plate 42. Rim 54 of the torch tip has slots 60 which allow passage of gas from chamber 22 towards the workpiece to form the secondary gas flow. Thus, when a gas supply (not shown) supplies a gas to chamber 22 flowing towards the outlet 50, the gas may escape through orifice 58 or slots 60 in the torch tip. In the present embodiment, the torch tip defines a flange shaped rim 54 with six evenly spaced slots 60. Rim 54 is recessed and has a shoulder 62 for connection with an annular member described below.

In reference to FIG. 1, the front end of electrode 40 has a portion which extends into the torch tip leaving an annular space 64 between it and the torch tip through which gas from chamber 22 may flow towards and through orifice 58. In the preferred embodiment, electrode 40 is cylindrical in shape and has a rear portion with a larger diameter than the front portion of the electrode which enables the electrode to be conveniently secured in the torch housing. The raised rear portion of the electrode defines shoulder 66. A gas distributor 72, made from an insulating material, is connected between shoulder 62 of the torch tip and the front shoulder 66 of electrode 40. The gas distributor surrounds electrode 40. The side of the gas distributor in contact with the electrode has a recess defining a shoulder 74. The raised rear portion of the electrode fits into this recess so that when the gas distributor is connected to the electrode, shoulder 74 of the gas distributor abuts shoulder 66 of the electrode. The gas distributor on the side opposite the shoulder 74 has a smaller outside diameter so that it fits into the recess in the rim of the torch tip. When the torch tip and the gas distributor are connected, the annular side 76 of the gas distributor abuts annular shoulder 62 of the torch tip. The inside diameter of the gas distributor adjacent to surface 76 is slightly larger than the diameter of the front end of the electrode. Therefore, when the gas distributor is connected between the electrode and the torch tip, the gas distributor and the electrode define therebetween a second annular chamber 82 which is in communication with the annular chamber 64 on one side but closed on the other.

FIGS. 4 and 5 illustrate the shape and construction of the gas distributor 72 in more detail. As shown in FIGS. 4 and 5, the gas distributor has a number of passages 84 tangential to the inside surface 86 of the gas distributor adjacent to the side 76. Thus when the gas distributor is in the position as shown in FIG. 1, passages 84 will be tangential to the second annular chamber 82. When gas flows from chamber 22 through passages 84 towards annular chamber 82, a gas swirl will be created in chamber 82. This gas swirl continues into the annular chamber 64 to create a vortex at the front end of the electrode. This vortex will direct the transferred arc through orifice 58 towards workpiece 42.

As shown also in FIG. 1, the gas distributor does not block the secondary gas flow from chamber 22 through slots 60 of the torch tip towards the workpiece. In the center of chamber 22 is electrode body 30 defining a hole in its center into which the electrode fits. When body 30 and electrode 40 are in the positions as shown in FIG. 1, they divide chamber 22 into a front portion 22a and a rear portion 22b.

The electrode body 30 and annular insulator 48 further define passages 90 around the electrode through which gas may pass between portions 22a, 22b of chamber 22.

When gas is supplied to tube 44, it will flow through the rear portion 22b of chamber 22 and passages 90 to reach front portion 22a of chamber 22. There the gas flow is diverted into two flows: a primary flow and a secondary flow. The primary flow will run through passages 84 tangential to the second annular chamber 82 to create a vortex and then through annular space 64 and orifice 58 to the outside as a plasma gas. The secondary gas flow will pass through slots 60 and then through the unblocked portion of outlet 50 between the torch tip and the front portion of the cup towards the workpiece for cooling the torch and the workpiece. If the plasma-arc torch 10 is used for cutting the workpiece, the pressure supplied to chamber 22 should be large enough to create a strong secondary flow for blowing away molten material from the cutting operation. The gas flow rates through slots 60 would depend on the relative cross-sectional areas of cross passages 84 to slots 60. Therefore, by selecting the appropriate ratio and gas pressure in chamber 22, the flow rates of the primary and secondary gas flows will be in predetermined ranges.

As shown in the cross-sectional view of Fig. 1, electrode 40 has at its front end an insert 100 of metal material having good longevity at high temperatures such as hafnium or zirconium or alloys thereof. Electrode 40 itself is usually made of electrically conductive metal such as, for example, copper.

Referring to FIGS. 1, 2A, 2B and 3, relief surfaces 110 generally in the form of ridges are made on those parts of the electrode 40 where arcing is to take place. In the present embodiment the ridges are made at a portion of the front part of the electrode which resides in the annular chamber 64.

Details of the relief surface 110 are best shown in FIG. 2B. In the preferred embodiment, the ridges are formed by knurling the designated electrode surfaces. The knurling operation moves metal from one area and plows it into a pair of spaced, parallel ridges defining a groove 12. The resulting groove and ridges form a pair of sharp edges. As may be seen, the sharp edges 114, 116 of the ridges are located radially outwardly of the side cylindrical surface of electrode 40. Groove 112 has a bottom 120 which is located radially inwardly of said side cylindrical surface. As seen in FIG. 2A a plurality of relief surfaces may be formed so as to produce a multiple helix pattern in spaced relation.

Referring again to FIG. 1, the torch's power supply (not shown) is connected to electrode 40 via body 30 and conduit 44. It is also connected to the anode assembly comprising torch tip 52, cup 14, and anode 16 via pilot lead 140.

As the torch is being started, a high-frequency high-voltage pulse(s) is (are) applied across the anode and cathode (electrode). Arcing generally takes place in the annular chamber 64 where the electric field is the strongest owing to the closer spacing between the electrodes there. In particular, the sharp edges of the ridges 114, 116, having a surface with much smaller radii of curvature, sustain thereabout substantially enhanced local electric fields. Thus, the ridges provide initiation lines for arcing that drastically reduce the arc firing voltage.

As described earlier in reference to FIG. 1, the torch of the present embodiment provides a flow of swirling plasma forming gas over electrode 40 and through annular chamber 64. The ridges 110 on the electrode are formed along the flow lines of the gas. This will minimize the disturbance on the flow characteristics which have been optimized for cutting. Thus helically spiraling ridges are knurled around the front end of the electrode as shown in FIG. 2A. One way to determine the pitch of the spiral is to operate the torch with a smooth electrode of the same dimension and observe the burn marks on the electrode resulting therefrom. In those systems where the ridges are so dimensioned as to not have an appreciable effect on the gas flow, the ridges may be oriented in any direction relative to the flow lines of the gas.

FIG. 3 illustrates another embodiment where the knurled ridges 110 run parallel to the longitudinal axis of the electrode 40 in spaced relation. The electrode in this case is suitable for those torches where the plasma gas does not swirl around the electrode but simply flows over it parallel to its longitudinal axis.

The above description of method and the construction used is merely illustrative thereof and various changes of the details and the method and construction may be made within the scope of the appended claims.

What is claimed is:

1. In a plasma-arc system comprising spaced, electrically conductive electrode means defining an arc chamber therebetween, pilot arc voltage supplying means connected to said electrode means, and means for supplying a flow of plasma forming gas through said arc chamber, the improvement which comprises:
    said electrode means including at least one electrode having at least one ridge formed thereon, said ridge being located substantially in said arc chamber and extending along said electrode so as to provide a path for arcing, thereby producing a longer wearing electrode.

2. The invention of claim 1 wherein said electrode is of generally rod shape so that said side surface is cylindrical.

3. The invention of claim 2 wherein said ridge spirals around said body in a helical direction.

4. The invention of claim 2 wherein said ridge is oriented in a longitudinal direction parallel to said longitudinal axis.

5. The invention of claim 2 further including a second ridge in spaced parallel relation with said first ridge.

6. The invention of claim 5 further including a groove intermediate said ridges.

7. The invention of claim 6 wherein said ridges define sharp edges which are located radially outward from said side cylindrical surface.

8. The invention of claim 6 wherein said groove has a bottom which is located radially inward of said side cylindrical surface.

9. An arc plasma system as in claim 1 wherein said ridge is part of a knurled surface.

10. An arc plasma system as in claim 1 wherein said ridge has an orientation substantially along lines of flow of said plasma forming gas.

* * * * *